United States Patent
Matsumoto

(10) Patent No.: US 9,281,920 B2
(45) Date of Patent: Mar. 8, 2016

(54) MOBILE STATION AND CONTROL INFORMATION DECODING METHOD

(75) Inventor: Naohisa Matsumoto, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 444 days.

(21) Appl. No.: 13/575,590

(22) PCT Filed: Jan. 26, 2011

(86) PCT No.: PCT/JP2011/000417
§ 371 (c)(1),
(2), (4) Date: Jul. 26, 2012

(87) PCT Pub. No.: WO2011/093072
PCT Pub. Date: Aug. 4, 2011

(65) Prior Publication Data
US 2012/0294271 A1    Nov. 22, 2012

(30) Foreign Application Priority Data

Jan. 27, 2010  (JP) ................................ 2010-015944
Jan. 27, 2010  (JP) ................................ 2010-015976

(51) Int. Cl.
*H04L 1/00* (2006.01)
*H04W 4/00* (2009.01)
(Continued)

(52) U.S. Cl.
CPC .............. *H04L 1/0042* (2013.01); *H04L 1/007* (2013.01); *H04L 1/0046* (2013.01);
(Continued)

(58) Field of Classification Search
CPC ........ H04W 72/00; H04W 24/10; H04L 1/08; H04L 1/42; H04L 1/46; H04L 1/61; H04L 1/67; H04L 1/72

USPC .......... 370/329, 311, 252; 375/341, 262, 130; 455/454, 450, 434, 67.11, 511; 714/794, 786, 792
See application file for complete search history.

(56) References Cited

U.S. PATENT DOCUMENTS 7,991,082 B2 *  8/2011  Laprade et al. ............... 375/341
2003/0125040 A1 *  7/2003  Walton et al. .................. 455/454
(Continued)

FOREIGN PATENT DOCUMENTS

JP     2011-061664 A       3/2011
WO   WO 2010151187 A1 *  12/2010

OTHER PUBLICATIONS

3GPP TS 36.211 V8.7.0 (May 2009) 3rd Generation Partnership Project; Technical Specification Group Radio Access Network; Evolved Universal Terrestrial Radio Access (E-UTRA); Physical Channels and Modulation (Release 8).
(Continued)

*Primary Examiner* — Alpus H Hsu
*Assistant Examiner* — Camquyen Thai
(74) *Attorney, Agent, or Firm* — Studebaker & Brackett PC

(57) ABSTRACT

A mobile station capable of efficiently detecting control information addressed thereto, by prioritizing CRC decoding to control channel element at a candidate position, is disclosed. A mobile station (1) according to the present invention, in order to detect the control information addressed from a base station to the mobile station itself included in a downlink control channel having a plurality of control channel elements, for decoding a signal of a control channel element at a candidate position to be assigned with the control information, includes a generating unit (10) configured to generate a reception level of each of the control channel elements at the candidate position and a control unit (20) configured to prioritize the control channel elements based on the reception level and to control decoding of the signal of each of the control channel elements in order of priority.

5 Claims, 7 Drawing Sheets

(51) Int. Cl.
    *H04B 17/00* (2015.01)
    *H04W 72/00* (2009.01)
    *H04B 7/00* (2006.01)
    *H04L 1/08* (2006.01)

(52) U.S. Cl.
    CPC ........... *H04L 1/0047* (2013.01); *H04L 1/0061* (2013.01); *H04L 1/0067* (2013.01); *H04L 1/0072* (2013.01); *H04L 1/08* (2013.01)

(56) References Cited

U.S. PATENT DOCUMENTS

| | | | | |
|---|---|---|---|---|
| 2008/0273479 | A1* | 11/2008 | Kwak et al. | 370/311 |
| 2009/0131070 | A1* | 5/2009 | Tajima et al. | 455/455 |
| 2009/0154607 | A1* | 6/2009 | Lindoff et al. | 375/341 |
| 2009/0170510 | A1* | 7/2009 | Kim | 455/434 |
| 2010/0098020 | A1* | 4/2010 | Kim et al. | 370/330 |
| 2010/0157927 | A1* | 6/2010 | Mochizuki et al. | 370/329 |
| 2010/0215011 | A1* | 8/2010 | Pan et al. | 370/329 |
| 2010/0232382 | A1* | 9/2010 | Gauvreau et al. | 370/329 |
| 2011/0064115 | A1* | 3/2011 | Xu et al. | 375/130 |
| 2011/0299489 | A1* | 12/2011 | Kim et al. | 370/329 |
| 2012/0172077 | A1 | 7/2012 | Nakayama | |

OTHER PUBLICATIONS

3GPP TS 36.212 V8.7.0 (May 2009) 3rd Generation Partnership Project; Technical Specification Group Radio Access Network; Evolved Universal Terrestrial Radio Access (E-UTRA); Multiplexing and channel coding (Release 8).

3GPP TS 36.213 V8.7.0 (May 2009) 3rd Generation Partnership Project; Technical Specification Group Radio Access Network; Evolved Universal Terrestrial Radio Access (E-UTRA); Physical layer procedures (Release 8).

Research in Motion UK Limited, Blind Decoding for Carrier Aggregation, 3GPP TSG RAN WG1 Meeting #59bis, R1-100566, Jan. 22, 2010.

Phillips, PDCCH Search Space for Carrier Aggregation, 3GPP TSG WG1 Meeting #57bis, R1-094990, Jul. 2009.

Phillips, PDCCH design and monitoring set for carrier aggregation, 3GPP TSG RAN WG1 Meeting #59, R1-094990, Nov. 2009.

International Search Report; PCT/JP2011/000417; Apr. 19, 2011.

* cited by examiner

FIG. 7
EXAMPLE WITH AGGREGATION LEVEL=1
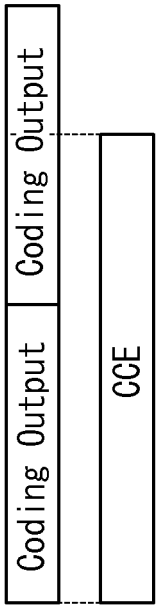
(a)
EXAMPLE WITH AGGREGATION LEVEL=2
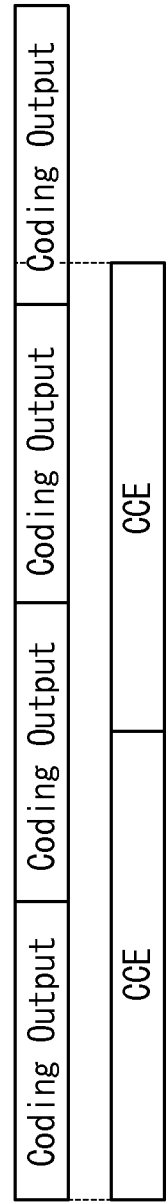
(b)

MOBILE STATION AND CONTROL INFORMATION DECODING METHOD

TECHNICAL FIELD

The present invention relates to a mobile station and a control information decoding method, and more specifically, to a mobile station for detecting the control information addressed thereto included in a downlink control channel transmitted from a base station and the control information decoding method.

BACKGROUND ART

A standards body of mobile communication methods, 3GPP, has recently been deliberating about LTE (Long Term Evolution). A base station adopting the LTE, in order to transmit user data to mobile stations under the control thereof, performs scheduling to determine assignment of user data channels to the mobile stations. Then, the base station, by using PDCCH (Physical Downlink Control Channel), informs each mobile station of a result of scheduling (control information) (for example, see Non-Patent Documents 1-3).

The control information from the base station is assigned to CCE (Control Channel Element) as a unit included in the PDCCH and transmitted to each mobile station. FIG. 6 is a diagram illustrating an example of assignment of the control information to the CCE. The number of CCEs used for the control information for each mobile station is called Aggregation Level (hereinafter, referred to as "AL"). The base station sets the AL assigned to each mobile station in consideration of the number of mobile stations under the control of the base station itself and radio communication quality of each mobile station. Any of numbers 1, 2, 4 and 8 is set as a value of the AL. When the AL is 2 or larger, the base station assigns the control information to consecutive AL-number of (for example, 2) CCEs. In a case of FIG. 6, the base station sets the value of the AL at 1 for a mobile station A and assigns the control information for the mobile station A to a second CCE. Also, the base station sets the value of the AL at 2 for a mobile station B and assigns the control information for the mobile station B to two consecutive CCEs, twelfth and thirteenth ones. When a data length of the control information for each mobile station is shorter than an assigned CCE, the base station, as illustrated in FIG. 7, performs Rate Matching to repeatedly set Coding Output including the same control information within the assigned CCE.

The base station adds CRC encoded by using a unique ID (RNTI: Radio Network Temporary Identifier) of a corresponding mobile station to the control information and transmits the control information to the mobile station. When the mobile station receives the PDCCH including the CCE from the base station, the mobile station decodes the CRC of a signal included in the CCE by using the unique ID of the mobile station itself and performs CRC (CRC decoding). When the CRC is passed, the mobile station may determine that the signal is the control information addressed thereto.

Since it is not efficient for the mobile station to perform the CRC to all of the CCEs included in the PDCCH, a candidate position to be assigned with the control information is set for each AL for each mobile station, as illustrated in FIG. 6. The candidate position may be calculated by using the unique ID of a terminal or the AL. For example, the mobile station A may find the control information (AL=1) addressed thereto by performing the CRC to first to fifth CCEs, which are at the candidate position when the AL is 1. Also, the mobile station B may find the control information (AL=2) addressed thereto by performing the CRC to tenth to thirteenth CCEs, which are at the candidate position when the AL is 2.

It is called "blind decoding" for the mobile station to perform the CRC decoding to the signal included in the CCE at the candidate position until the control information is detected without knowing the position of the control information addressed to the mobile station itself transmitted from the base station, as described above. The mobile station performs the CRC decoding to the CCE at a corresponding candidate position, in an appropriate order. When the mobile station finds the control information addressed thereto by the blind decoding, the mobile station may acquire user data addressed thereto and transmit uplink data by using the control information.

RELATED ART DOCUMENTS

Non-Patent Documents

Non-Patent Document 1: 3GPP TR36.211 (V8.7.0), "Physical Channels and Modulation", May 2009
Non-Patent Document 2: 3GPP TS36.212 (V8.7.0), "Evolved Universal Terrestrial Radio Access (E-UTRA) Multiplexing and channel coding", May 2009
Non-Patent Document 3: 3GPP TS36.213 (V8.7.0), "Evolved Universal Terrestrial Radio Access (E-UTRA) Physical layer procedures", May 2009

SUMMARY OF INVENTION

Technical Problem

As described above, the blind decoding currently has a problem in terms of processing efficiency such as that the mobile station performs the CRC decoding to the CCE that is less likely to include the control information.

Accordingly, an object of the present invention in consideration of the problem is to provide a mobile station capable of efficiently detecting the control information addressed thereto.

Solution to Problem

In order to solve the above problem, a mobile station according to a first aspect of the present invention, in order to detect control information addressed from a base station to the mobile station itself included in a downlink control channel having a plurality of control channel elements, for decoding a signal of a control channel element at a candidate position to be assigned with the control information, includes:

a generating unit configured to generate a reception level of each of the control channel elements at the candidate position; and a control unit configured to prioritize the control channel elements based on the reception level and to control decoding of the signal of each of the control channel elements in order of priority.

A second aspect of the present invention is the mobile station according to the first aspect, in order to detect the control information included in N-number (N>1) of consecutive control channel elements, determining whether a change in the reception level of the N-number of consecutive control channel elements at the candidate position to be assigned with the control information is equal to or over a threshold and, when the change in the reception level is equal to or over the threshold, giving the N-number of consecutive control channel elements low priorities.

A third aspect of the present invention is the mobile station according to the first aspect, wherein the generating unit generates an average soft value of the signal included in each of the control channel elements as the reception level, and the control unit prioritizes the control channel elements based on the average soft value of the signal.

A mobile station according to a fourth aspect of the present invention, in order to detect control information addressed from a base station to the mobile station itself included in a downlink control channel having a plurality of control channel elements, for decoding a signal of a control channel element at a candidate position to be assigned with the control information, includes:

a memory unit configured to store the number of control channel elements including previous control information; and a control unit configured to control to start decoding the signal of the control channel element at the candidate position to be assigned with the control information, the candidate position corresponding to the number of control channel elements.

A mobile station according to a fifth aspect of the present invention, in order to detect control information addressed from a base station to the mobile station itself included in a downlink control channel having a plurality of control channel elements, for decoding a signal of a control channel element at a candidate position to be assigned with the control information, includes:

a memory unit configured to store a correspondence table of a reception quality report transmitted to the base station and the number of control channel elements including the control information received from the base station after transmitting the reception quality report; and a control unit configured to control, after transmitting a new reception quality report to the base station, to acquire the number of control channel elements corresponding to the new reception quality report based on the correspondence table and to start decoding the signal of the control channel element at the candidate position to be assigned with the control information corresponding to the acquired number of control channel elements.

A sixth aspect of the present invention is the mobile station according to the fifth aspect, wherein the control unit, when a control signal addressed to the mobile station is not included in the candidate position corresponding to the number of control channel elements acquired from the correspondence table but detected at a candidate position corresponding to a second number of control channel elements smaller than the number of control channel elements, controls to start decoding the signal of the control channel element at the candidate position to be assigned with the control information corresponding to the second number of control channel elements in subsequent detection of the control information.

A seventh aspect of the present invention is the mobile station according to the first aspect, wherein, in order to detect the control information included in consecutive N-number (N>1) of control channel elements, it is determined whether a reception level of a part of the N-number of consecutive control channel elements is equal to or over a threshold and, when the reception level of the part of the N-number of consecutive control channel element is equal to or over the threshold, the decoding unit is controlled to decode only the part of the N-number of consecutive control channel elements.

Although an apparatus is used as a solution according to the present invention as described above, it should be understood that the present invention can also be substantialized by methods, programs, storage media storing programs practically equivalent to the apparatus, hence they are included in a scope of the present invention.

For example, as a method substantializing the present invention, a control information decoding method according to an eighth aspect, in order to detect control information addressed from a base station to a mobile station itself included in a downlink control channel having a plurality of control channel elements, for decoding a signal of the control channel element at a candidate position to be assigned with the control information, including:

a step for generating a reception level of each of the control channel elements at the candidate position; and a step for prioritizing the control channel elements based on the reception level and for controlling decoding of the signal of each of the control channel elements in order of priority.

Also, as a method substantializing the present invention, a control information decoding method according to a ninth aspect, in order to detect control information addressed from a base station to a mobile station itself included in a downlink control channel having a plurality of control channel elements, for decoding a signal of the control channel element at a candidate position to be assigned with the control information, including:

a step for storing the number of control channel elements including previous control information; and a step for controlling to start decoding the signal of the control channel element at the candidate position to be assigned with the control information corresponding to the number of control channel elements.

Further, as a method substantializing the present invention, a control information decoding method according to a tenth aspect, in order to detect control information addressed from a base station to a mobile station itself included in a downlink control channel having a plurality of control channel elements, for decoding a signal of the control channel element at a candidate position to be assigned with the control information, including:

a step for storing a correspondence table of a reception quality report transmitted to the base station and the number of control channel elements including the control information received from the base station after transmission of the reception quality report; and a step for controlling, after transmitting a new reception quality report to the base station, to acquire the number of control channel elements corresponding to the new reception quality report based on the correspondence table and to start decoding the signal of the control channel element at the candidate position to be assigned with the control information corresponding to the acquired number of control channel elements.

Effect of the Invention

According to the present invention, the control information addressed to the mobile station itself may be efficiently detected.

BRIEF DESCRIPTION OF DRAWINGS

FIG. 7 is a diagram illustrating an example of iteration of the control information in the CCE.

DESCRIPTION OF EMBODIMENTS

Embodiments of the present invention will be described with reference to the accompanying drawings.

First Embodiment

Figure 1:
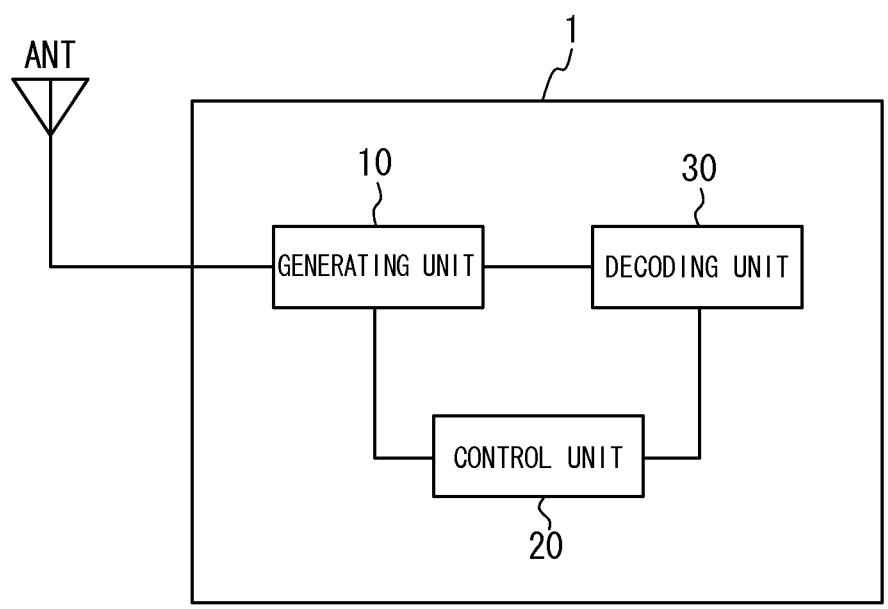
FIG. 1 is a functional block diagram illustrating a mobile station according to a first embodiment of the present invention.

FIG. 1 is a diagram illustrating a schematic configuration of a mobile station 1 according to a first embodiment of the present invention. The mobile station 1 includes an antenna ANT, a generating unit 10, a control unit 20 and a decoding unit 30. The generating unit 10 is constituted by using an interface equipment/circuit suitable for LTE, and the control unit 20 and the decoding unit 30 are constituted by using appropriate processors such as CPUs. Each of the units will be described in detail below.

When the generating unit 10 receives a signal of PDCCH (a downlink control channel) from a base station via the antenna ANT, the generating unit 10 performs Resource Element Demapping and demodulation to the received signal and generates a bit string (a soft value string: reception level) of each CCE (Control Channel Element) at a candidate position. Here, the soft value is neither 1 nor 0 but a value that is "likely 1" or "likely 0" representing an each CCE bit value and also called likelihood. With the soft value in a range of −10 to 10, for example, a bit that is more "likely 0" may be represented by a soft value closer to −10, and a bit that is more "likely 1" may be represented by a soft value closer to 10.

Figure 2:
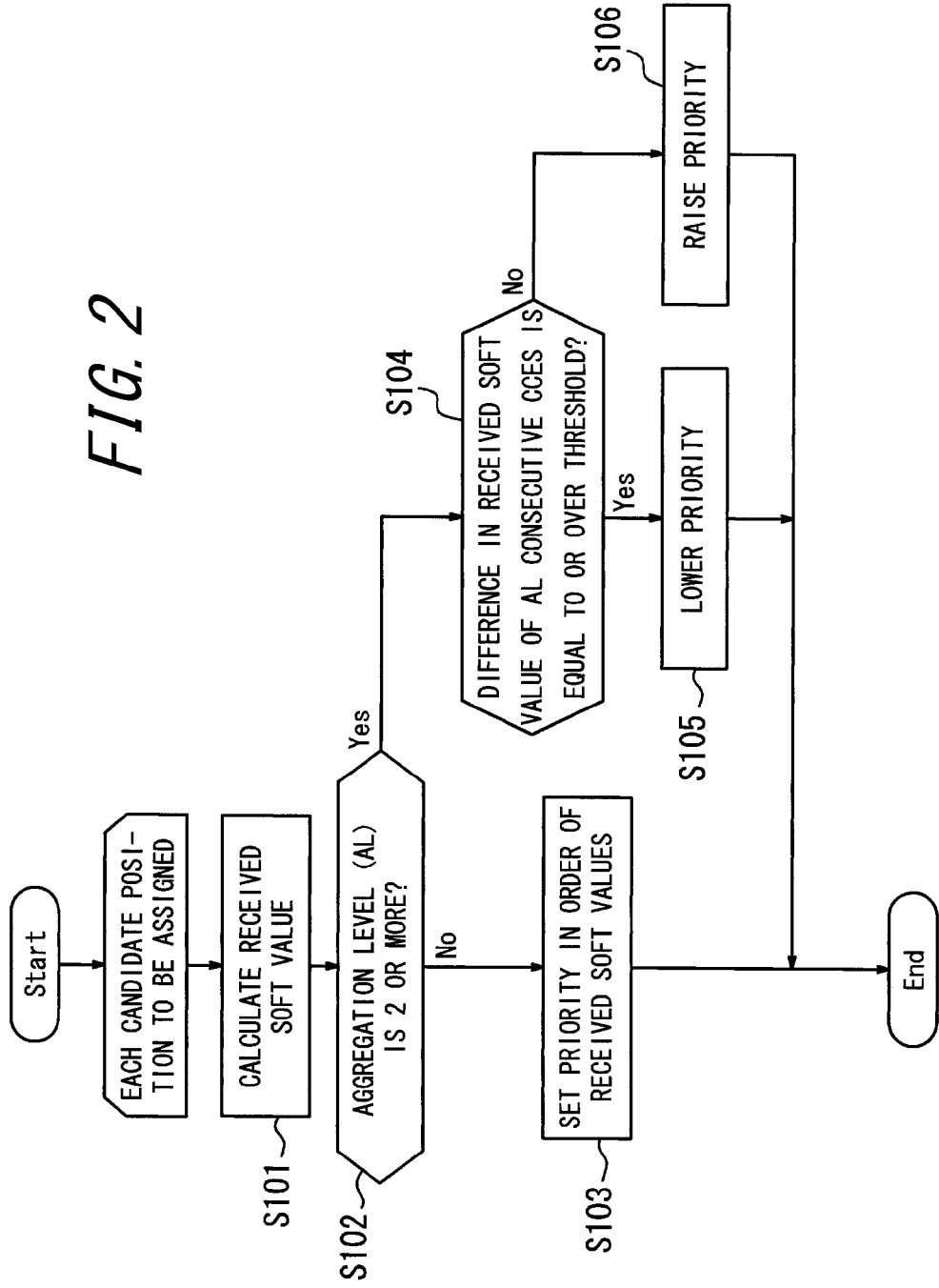
FIG. 2 is a process flowchart of a control unit of the mobile station illustrated in FIG. 1.

The control unit 20 prioritizes the CCEs at the candidate position to be assigned with the control information based on the soft value string generated by the generating unit 10 and controls the decoding unit 30 to perform CRC decoding to the signal of each CCE in order of priority. FIG. 2 is a process flowchart of the control unit 20.

The control unit 20 calculates an average soft value (or an average of absolute values of the soft value) of each CCE at the candidate position to be assigned with the control information (step S101). As described above, for example, when the soft value is within the range of −10 to 10 and the bit more "likely 0" is represented by the soft value closer to −10 and the bit more "likely 1" is represented by the soft value closer to 10, the signal included in the CCE becomes easier to be distinguished between 0 and 1 as the average of the absolute values of the soft value is higher. That is, the CCE having a higher average of the soft values is more likely to include the control information addressed to the mobile station itself or another station. Therefore, the control unit 20, first by calculating the average of the soft values of each CCE, may determine whether the CCE includes the control information.

In order to detect the control information when AL=1 (No at step S102), the control unit 20 prioritize the CCEs at the candidate position in an order of a higher average of the soft values (step S103). As described above, since the CCE with a higher average of the soft values includes more signals easy to be distinguished between 0 and 1, a signal with a higher average of the soft value has higher reliability and highly likely to be decoded as a control signal.

Figure 6:
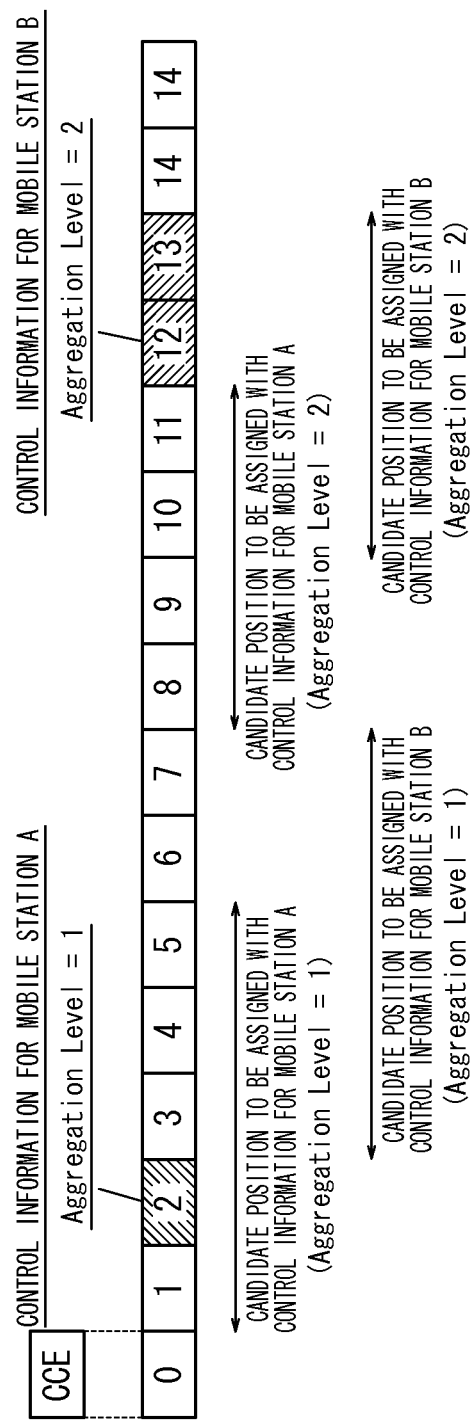
FIG. 6 is a diagram illustrating an example of assignment of the control information to CCE.

In order to detect the control information when AL≥2 (for example, AL=2, 4 or 8) (Yes at step S102), the control unit 20 determines whether the average of the soft values of each of AL-number of consecutive CCEs is changed (step S104). As illustrated in FIG. 6, for example, the control information with AL=2 for a mobile station (B) is assigned to two consecutive CCEs (12th and 13th CCEs). As illustrated in FIG. 7, also, Coding Output including the control information is repeatedly set for the consecutive CCEs. Therefore, when the control information is assigned to where the AL is 2 or more, each of the AL-number of consecutive CCEs has the average of the soft values close to each other and thus the average of the soft values are less likely to be significantly different. That is, when the averages of the soft values of the AL-number of consecutive CCEs are significantly different from one another, it is considered that each of the CCEs is less likely to include the control information with the AL being 2 or higher. Therefore, when the difference between the averages of the soft values of the AL-number of consecutive CCEs is equal to or over a threshold, the control unit 20 lowers the priority of the AL-number of consecutive CCEs (step S105). On the other hand, when the difference between the averages of the soft values of the CCEs is smaller than the threshold, the control unit 20 raises the priority of the AL-number of consecutive CCEs, assuming that the control information when the AL is 2 or more is likely to be included therein (step S106).

Based on the priority set by the control unit 20, the decoding unit 30 decodes the CRC (Cyclic Redundancy Code) of the signal included in each of the CCEs by using the unique ID of the mobile station thereof and performs CRC (Cyclic Redundancy Checking). When the CRC (Cyclic Redundancy Checking) is passed, the mobile station may determine that the signal is the control information addressed thereto.

According to the present embodiment, as described above, when the generating unit 10 generates the soft value string of the CCE at the candidate position to be assigned with the control information, the control unit 20 prioritizes the CCEs to be decoded based on the average soft value of the soft value strings, and the decoding unit 30 performs the CRC decoding to each of the CCEs in order of priority. Therefore, the mobile station according to the present embodiment may perform the CRC decoding from the CCE that is more likely to include the control information and thus efficiently detect the control information addressed to the mobile station itself. Further, as being able to quickly detect the control information, the mobile station may promptly perform subsequent processing such as reception of user data by using the control information and data transmission on an uplink.

Also, in order to detect the control information included in N(N>1)-number of consecutive CCEs when the AL is 2 or more, the control unit 20 determines whether a change in the reception level of the N-number of consecutive CCEs at the candidate position is equal to or over a threshold and, when the change in the reception level is equal to or over the threshold, lowers the priority of the N-number of consecutive CCEs. Therefore, the mobile station may perform the CRC decoding to the CCEs highly likely to include the control information when the AL is 2 or more before the CCEs less likely to include the control information when the AL is 2 or more. Thereby, the mobile station may efficiently detect the control information addressed thereto.

Second Embodiment

Figure 3:
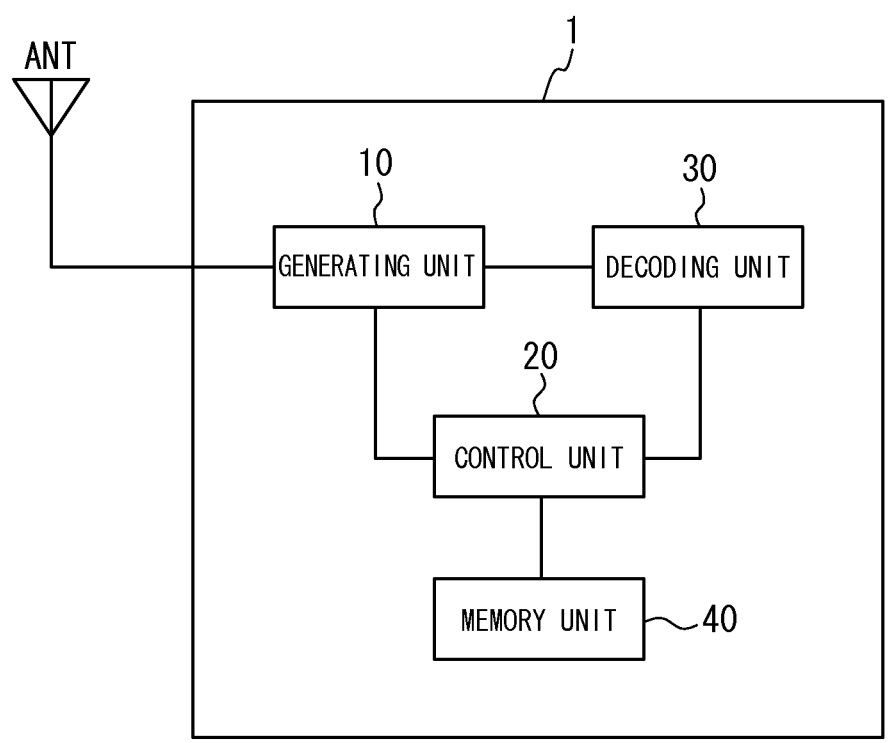
FIG. 3 is a functional block diagram illustrating a mobile station according to a second embodiment of the present invention.

FIG. 3 is a diagram illustrating a schematic configuration of the mobile station 1 according to a second embodiment of the present invention. The mobile station 1 includes the antenna ANT, the generating unit 10, the control unit 20, the decoding unit 30 and a memory unit 40. The generating unit 10 is constituted by using an interface equipment/circuit suitable for the LTE, and the control unit 20 and the decoding unit 30 are constituted by using appropriate processors such as the CPUs. Each of the units will be described in detail below.

When the generating unit 10 receives the signal of PDCCH (the downlink control channel) from the base station via the antenna ANT, the generating unit 10 performs Resource Element Demapping and demodulation to the received signal and generates the bit string of each CCE (Control Channel Element) at the candidate position. Also, the generating unit 10 measures quality of the received signal from the base station and generates CQI (Channel Quality Indicator: reception quality report) to be transmitted to the base station.

Referring to the memory unit 40, the control unit 20 predicts the AL (the number of control channel elements) that is highly likely to be set for the mobile station thereof and controls the decoding unit 30 to start the CRC decoding from the CCE at the candidate position corresponding to the predicted AL.

Figure 4:
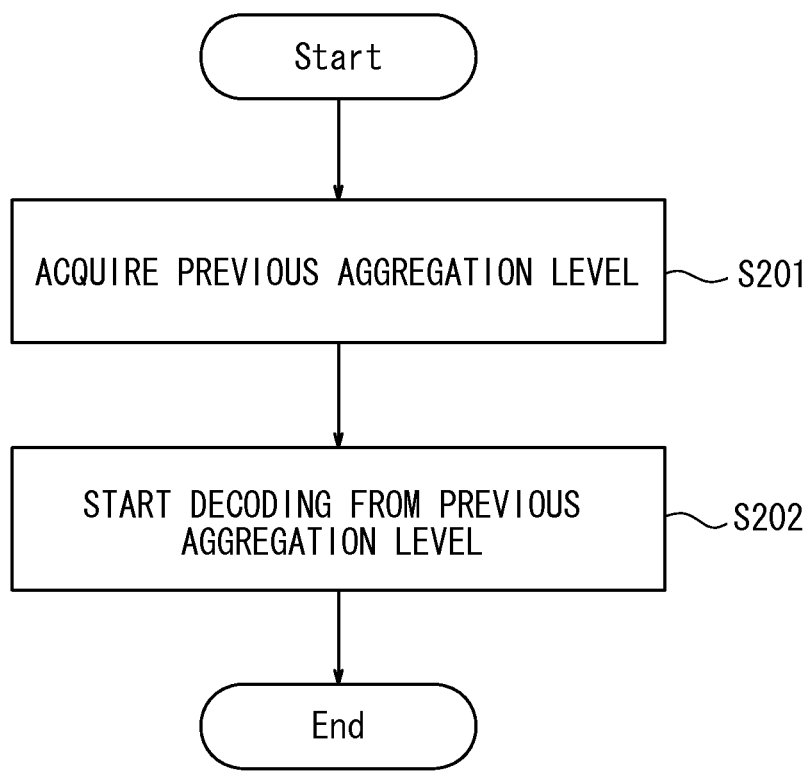
FIG. 4 is a process flowchart of the control unit of the mobile station illustrated in FIG. 3.

FIG. 4 is a process flowchart illustrating a first algorithm of the control unit 20. In this case, the memory unit 40 stores the AL of the control information addressed to the mobile station thereof included in a previous downlink control channel. The AL of the control information is synonymous with the number of CCEs (Control Channel Elements) including the control information. The control unit 20 acquires a previous AL including the control information from the memory unit 40 (step S201). The AL is set by the base station and, when there is no significant change in a communication condition with the mobile stations under the control of the base station itself, the base station may set the same AL for the same mobile station. Therefore, the control unit 20 controls the decoding unit 30 to perform the CRC decoding from the CCE at the candidate position corresponding to the previous AL acquired from the memory unit 40 (step S202).

Figure 5:
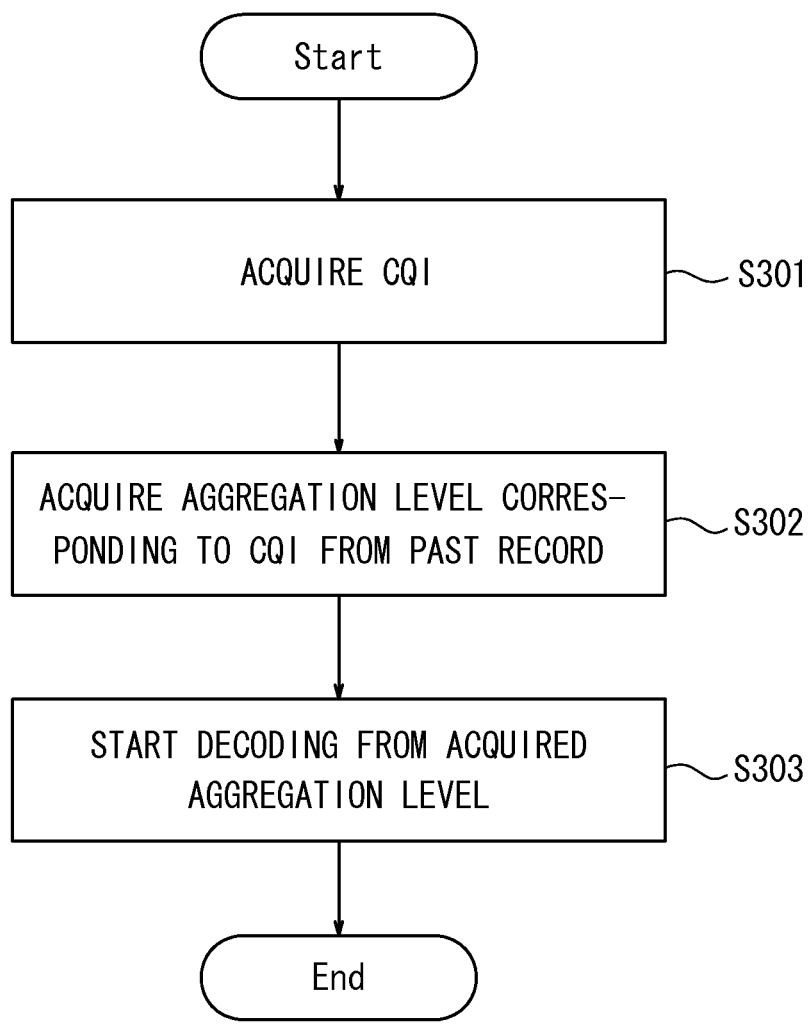
FIG. 5 is a process flowchart of the control unit of the mobile station illustrated in FIG. 3.

FIG. 5 is a process flowchart illustrating a second algorithm of the control unit 20. In this case, the memory unit 40 stores a correspondence table of the CQI transmitted from the mobile station to the base station and the AL of the control information received from the base station after transmission of the CQI. The control unit 20 acquires, from the generating unit 10, the CQI to be newly transmitted to the base station (step S301) and the AL corresponding to the CQI from the memory unit 40 based on the correspondence table (step S302). The AL is set by the base station and, when there is no significant change in the communication condition with the mobile stations under the control of the base station itself, the base station may maintain a relationship between the CQI received from the mobile station and the AL to be set for the mobile station. Therefore, the control unit 20 controls the decoding unit 30 to perform the CRC decoding from the CCE at the candidate position corresponding to the AL corresponding to the CQI to be newly transmitted (step S303).

Under the control of the control unit 20, the decoding unit 30 decodes the CRC of the signal included in each CCE by using the unique ID of the mobile station thereof and performs CRC. When the CRC is passed, the mobile station may determine that the signal is the control information addressed thereto.

According to the present embodiment, as described above, since the memory unit 40 stores the previous AL of the control information and the control unit 20 controls to start decoding the signal from the CCE at the candidate position to be assigned with the control information based on the previous AL, the mobile station 1 may efficiently detect the control information addressed thereto. Moreover, as being able to quickly detect the control information, the mobile station may promptly perform subsequent processing such as reception of user data by using the control information and data transmission on the uplink.

According to the present embodiment, the memory unit 40 stores the correspondence table of the CQI transmitted to the base station and the AL of the control information received from the base station after transmission of the CQI, and the control unit 20, after transmitting the new CQI to the base station, acquires the AL corresponding to the new CQI from the correspondence table and controls to start decoding the signal from the CCE at the candidate position to be assigned with the control information corresponding to the AL. Therefore, the mobile station 1 may efficiently detect the control information addressed thereto.

In the second algorithm, when the control signal addressed to the mobile station itself is not located at the candidate position corresponding to the AL acquired from the correspondence table of the memory unit 40 but detected at the candidate position of a second AL smaller than the acquired AL, the control unit 20, in detection of the control information thereafter, may control to start decoding the signal from the CCE at the candidate position to be assigned with the control information corresponding to the second AL. As described above, although the base station generally maintains the relationship between the CQI received from the mobile station and the AL to be set for the mobile station, there may be cases which prevent the base station from maintaining the relationship between the CQI and the AL, such as when the number of mobile stations under the control of the base station itself is increased. In this case, since it is considered that the base station may set the AL at a value smaller than the AL corresponding to the CQI for the mobile station, the mobile station 1, by starting the CRC decoding based on the smaller AL, may efficiently detect the control information addressed thereto. In this case, the mobile station 1 may start the CRC decoding based on the smallest AL, such as AL=1, for example.

Although the present invention is described based on the figures and the embodiments, it is to be understood that those who are skilled in the art may easily vary or alter in a multiple manner based on disclosure of the present invention. Accordingly, such variation and alteration are included in a scope of the present invention. For example, a function or the like of each component or each step may be rearranged avoiding a logical inconsistency, by combining a plurality of components or steps or by dividing the component or the step.

For example, although the reception level generated by the generating unit for each of the control channel elements is used as the soft value according to the first embodiment, the reception level according to the present invention is not limited to the soft value but may use various information such as reception intensity, SINR (Signal to Noise Interference Ratio) and the like.

For example, further, when the AL is 2 or more and in order to detect the control information included in two or more consecutive CCEs, the control unit 20 may determine whether the reception level (reception intensity, the average soft value and the like) of a part of the consecutive CCEs is equal to or over the threshold and, when the reception level is equal to or over the threshold, control to perform the CRC decoding only to the part of the consecutive CCEs. This is because, as described above, likelihood to include the control information may be determined based on the reception level of the CCE and, when the reception level is high enough, the signal has high reliability and likely to be decoded as the control signal. That is, since the mobile station performs the CRC decoding only to the CCEs that are likely to include the control information, the mobile station may prevent unnecessary repetitive processing and efficiently detect the control information addressed thereto.

REFERENCE SIGNS LIST 1 mobile station
10 generating unit
20 control unit
30 decoding unit
40 memory unit

The invention claimed is:

1. A mobile station, in order to detect control information addressed from a base station to the mobile station itself included in a downlink control channel having a plurality of control channel elements, for decoding a signal of a control channel element at a candidate position to be assigned with the control information, comprising:
   a generating unit configured to generate a reception level of each of the control channel elements at the candidate position; and
   a control unit configured to prioritize the control channel elements based on the reception level and to control decoding of the signal of each of the control channel elements in order of priority, wherein
   the generating unit generates an average soft value of the signal included in each of the control channel elements as the reception level, the soft value being neither 1 nor 0 but a value that is likely 1 or likely 0, and
   the control unit prioritizes the control channel elements based on the average soft value of the signal, and
   the control unit, to detect control information included in N-number (N>1) of consecutive control channel elements, determines whether a change in the reception level of the N-number of consecutive control channel elements at the candidate position potentially assigned the control information is equal to or over a threshold and, when the change in the reception level is equal to or over the threshold, the control unit gives the N-number of consecutive control channel elements low priorities.

2. The mobile station according to claim 1, wherein the control unit, in order to detect the control information included in consecutive N-number (N>I) of control channel elements, determines whether a reception level of a part of the N-number of consecutive control channel elements is equal to or over a threshold and, when the reception level of the part of the N-number of consecutive control channel element is equal to or over the threshold, controls the decoding unit to decode the part of the N-number of consecutive control channel elements.

3. A mobile station, in order to detect control information addressed from a base station to the mobile station itself included in a downlink control channel having a plurality of control channel elements, for decoding a signal of a control channel element at the candidate position to be assigned with the control information, comprising:
   a memory unit configured to store a correspondence table of a reception quality report transmitted to the base station and the first number of control channel elements including the control information received from the base station after transmitting the reception quality report; and
   a control unit configured to control, after transmitting a new reception quality report to the base station, to acquire the first number of control channel elements corresponding to the new reception quality report based on the correspondence table and to start decoding the signal of the control channel element at the candidate position to be assigned with the control information corresponding to the acquired first number of control channel elements, wherein
   the control unit, when a control signal addressed to the mobile station is not included in the candidate position corresponding to the first number of control channel elements acquired from the correspondence table but detected at a candidate position corresponding to a second number of control channel elements smaller than the first number of control channel elements, controls to start decoding the signal of the control channel element at the candidate position to be assigned with the control information corresponding to the second number of control channel elements in subsequent detection of the control information, and
   the control unit in order to detect the control information included in consecutive N-number (N>I) of control channel elements, determines whether a reception level of a part of the N-number of consecutive control channel elements is equal to or over a threshold and, when the reception level of the part of the N-number of consecutive control channel elements is equal to or over the threshold, controls to decode the part of the N-number of consecutive control channel elements.

4. A control information decoding method, in order to detect control information addressed from a base station to a mobile station itself included in a downlink control channel having a plurality of control channel elements, for decoding a signal of the control channel element at a candidate position to be assigned with the control information, comprising:
   a step for generating a reception level of each of the control channel elements at the candidate position; and
   a step for prioritizing the control channel elements based on the reception level and for controlling decoding of the signal of each of the control channel elements in order of priority, wherein
   in the step for generating, an average soft value of the signal included in each of the control channel elements is generated as the reception level, the soft value being neither 1 nor 0 but a value that is likely 1 or likely 0, and
   in the step for prioritizing, the control channel elements are prioritized based on the average soft value of the signal, and
   in the step for prioritizing, in order to detect the control information included in N-number (N>1) of consecutive control channel elements, it is determined whether a change in the reception level of the N-number of consecutive control channel elements at the candidate position potentially assigned the control information is equal to or over a threshold and, when the change in the reception level is equal to or over the threshold, the N-number of consecutive control channel elements are given low priorities.

5. A control information decoding method, in order to detect control information addressed from a base station to a mobile station itself included in a downlink control channel having a plurality of control channel elements, for decoding a signal of the control channel element at a candidate position to be assigned with the control information, comprising:
   a step for storing a correspondence table of a reception quality report transmitted to the base station and the number of control channel elements including the control information received from the base station after transmission of the reception quality report; and a step for controlling, after transmitting a new reception quality report to the base station, to acquire the number of control channel elements corresponding to the new reception quality report based on the correspondence table and to start decoding the signal of the control channel element at the candidate position to be assigned with the control information corresponding to the acquired number of control channel elements, wherein in the step for controlling, when a control signal addressed to the mobile station is not included in the candidate position corresponding to the first number of control channel elements acquired from the correspondence table but detected at a candidate position corresponding to a second number of control channel elements smaller than the first number of control channel elements, controlling to start decoding the signal of the control channel element at the candidate position to be assigned with the control information corresponding to the second number of control channel elements in subsequent detection of the control information, and wherein in the step for controlling, in order to detect the control information included in consecutive N-number (N>1) of control channel elements, determining whether a reception level of a part of the N-number of consecutive control channel elements is equal to or over a threshold and, when the reception level of the part of the N-number of consecutive control channel elements is equal to or over the threshold, controlling to decode the part of the N-number of consecutive control channel elements.

* * * * *